United States Patent [19]

Komissarchuk et al.

[11] 4,003,282
[45] Jan. 18, 1977

[54] MACHINE FOR THE HOT SHEARING OF ROLLED PRODUCTS

[76] Inventors: Jury Stepanovich Komissarchuk, B. Cherkizovskaya ulitsa, 3, korpus 4, kv. 88; Nikolai Ivanovich Krylov, 1 Kuzminskaya ulitsa, 25, kv. 26; Boris Vasilievich Popov, Zelenodolskaya ulitsa, 24, kv. 110; Viktor Davydovich Lurie, 2 Kabelnaya ulitsa, 10, kv. 19, all of Moscow, U.S.S.R.

[22] Filed: Jan. 30, 1975

[21] Appl. No.: 545,424

[52] U.S. Cl. .................................. 83/490; 83/329
[51] Int. Cl.² ..................... B23D 19/00; B26D 1/18
[58] Field of Search .................. 83/490, 329, 330

[56] References Cited
UNITED STATES PATENTS

| | | | |
|---|---|---|---|
| 2,692,645 | 10/1954 | Driesch | 83/490 X |
| 3,213,731 | 10/1965 | Renard | 83/329 X |
| 3,491,637 | 1/1970 | Hasten et al. | 83/490 X |
| 3,738,215 | 6/1973 | Craig | 83/490 X |
| 3,822,621 | 7/1974 | Knights et al. | 83/490 X |

*Primary Examiner*—Willie G. Abercrombie
*Attorney, Agent, or Firm*—Lackenbach, Lilling & Siegel

[57] ABSTRACT

A machine for the hot shearing of rolled product as it emerges from continuous casting plants incorporates a driven cutting disk fitted to a shaft and a carrier given the form of a shaft supported by bearings inside the housing of a reducer; the diameter of one of the bearings is smaller than the diameter of cutting disk and radius of this bearing is bigger than the distance between the parallel axes of carrier and disk shaft, said distance being also not smaller than half the size of the rolled product in its cross section.

10 Claims, 2 Drawing Figures

MACHINE FOR THE HOT SHEARING OF ROLLED PRODUCTS

The present invention relates to metallurgical engineering, and more specifically to machines for the hot shearing of rolled products. Said machine can be used to advantage as a means of cutting hot rolled products of considerable cross section and may find application in conjunction with continuous casting plants and billet mills. It is also suitable for cutting the heads and dealing with similar jobs.

There are known machines (shears) for the shearing of hot rolled products comprising a shaft with a serrated cutting disk disposed on rolling-contact bearings in a carrier, a centrally-located sun shaft driving the disk and a motor driving the carrier through the intermediary of a reducer, the axis of rotation of disk-carrying shaft being parallel to that of carrier (USSR Author's Certificate No. 420,414; Cl. B23d; 45/22).

In machines of this kind, the cutting disk which rotates continuously is fed either by the operator or automatically onto the rolled product, cuts same and then is brought to a halt, waiting for the next order. The travel of the disk along a circular path in cutting appears to be more effective than the reciprocating feed met with in shears of other design because the cutting operation is shorter and the disk leaves the hot zone quicker, provided the average rates of feed are the same. Moreover, the working cycle of a machine with the circular feed of disk includes just one acceleration and braking of the carrier whereas the reciprocating motion calls for each operation to be performed twice. It stands thus to reason that the machines feeding the disk over a circular path hold out a better promise.

The layout of said machines is as follows. The carrier integrally with additional moving masses which serve to accumulate the energy required for cutting rapidly the rolled product is made as a massive separate unit with the bearings disposed on each side of the cutting disk. The carrier is driven from a motor through a reducer and coupling, and the disk-driving motor imparting motion to the centrally-located sun shaft is arranged as a rule on the opposite side of the carrier.

Said layout is a practical possibility only if the inequality $R_b > R$ is correct, where $R_b$ is the distance from the axis of rotation of the carrier to the axis of rotation of the disk shaft and $R$ is the radius of cutting disk. Machines intended to cut rolled products of considerable cross section, say of a diameter varying between 250 and 600 mm, are equipped with disks of a radius, $R$, up to 1.6 m. In this case, the disk shaft is disposed in the carrier at a distance of between 1.6 and 2.5 m from the axis of rotation of the carrier. Quite naturally that the consequences of a solution like this are a large floor area under the machine, high weight of units, a powerful carrier-driving motor capable of accelerating and stopping big moving masses every revolution, poor conditions for cutting, and difficulties experienced in upkeeping the machine.

It is an object of the present invention to eliminate said disadvantages.

The primary object of the present invention is to provide a machine for the hot shearing of rolled products wherein the distance between the axes of the carrier and cutting disk is reduced with the result that the conditions of cutting are improved, i.e., the effectiveness of the circular feed is increased, the machine is a compact one and poses no problems in upkeeping.

Said object is attained by the fact that in a machine for the hot shearing of rolled products incorporating a separated cutting disk with a drive, said disk being mounted on a shaft supported by bearings disposed in a carrier which receives rotary motion from a motor through a reducer and serves to feed the cutting disk onto the rolled product along a circular path, the axis of rotation of disk remaining parallel to that of the carrier, the carrier according to the invention is a shaft supported in a housing of reducer by bearings and the diameter of one of the bearings is smaller than the diameter of cutting disk whereas the radius of this bearing is larger than the distance between the parallel axes of the carrier and disk shaft, said distance being at the same time not smaller than half the size of the rolled product in its cross-section.

By virtue of the layout offered the size and, consequently, the weight of carrier are reduced and so are the moving masses acting on the shaft of carrier-driving motor. At the same time, the conditions of cutting approach their optimum as this will be shown hereinafter. A considerable reduction of the distance between the axes of the disk shaft and carrier provides for assembling the machine in a single housing. This improves the conditions of lubricating the units, increases the rigidity of the structure, minimizes the floor area occupied by the machine and simplifies the problem of protecting same against thermal radiation.

The present invention will be best understood from a description of a preferred embodiment of the invention when this description is being read in conjunction with the accompanying drawings in which.

As pointed out above, in the machine of known layout the inequality $R_b > R$ is correct. In fact, said inequality fails to provide for optimum conditions of cutting. Referring to FIG. I wherein the disks are of the same radius, $R$, and the carriers are given different radii, $R_b'$ and $R_b''$, it can be seen that the feed of disk onto the rolled product (as determined by the projections $V'$ and $V''$ on a line connecting the centres of disk and rolled product) is at its maximum and the moment applied to carrier (as determined by the angle formed between the normal component of the resultant cutting force and a normal to the carrier) is at its minimum when the angle, $\gamma$, is close to 90°. Since the angle $\gamma$ varies through the process of cutting, it is obvious that the optimum conditions of cutting are achieved when the angle $\gamma$ is somewhat smaller of 90° during the first instant and then, as the disk being its cutting action and penetrates the rolled product at a speed which has changes insignificantly increases so as to be equal to 90°. Using the notations of FIG. I, said condition can be expressed from the triangle $OC_1O_1$ by the relationship $$R_b \leq \frac{R(2z + \lambda) - z\lambda}{R - z - \lambda} \qquad (1)$$

Practical experience goes to show that the acceptable value of $R:r$ is between 5 and 8 and that complete cutting of the rolled product and provision for re-sharpening of the disk are assured if $\lambda = 0.5\ r$. Substituting $r = R/m$ and $\lambda = R/n$ in equation (I) we arrive at $$R_b \leq R \frac{m + 2n - 1}{mn - m - n} \qquad (2)$$

Since $\lambda = 0.5\ r$, $n = 2\ m$ and $m > 5$, we obtain:

$$\frac{R_b}{R} \leq \frac{3m - 1}{m(2m - 3)} < 1 \qquad (3)$$

Thus, it can be proved analytically that even if $R_b > R$ the conditions of cutting cannot be at their optimum because in this case the angle $\gamma$ is equal to 90° when the mechanism is idling. The fulfillment of condition (3) enables a considerable reduction in overall dimensions of the shears with the disk accommodated on the carrier, improves both the distribution of forces in, and the kinematics of, said shears.

Figure 1:
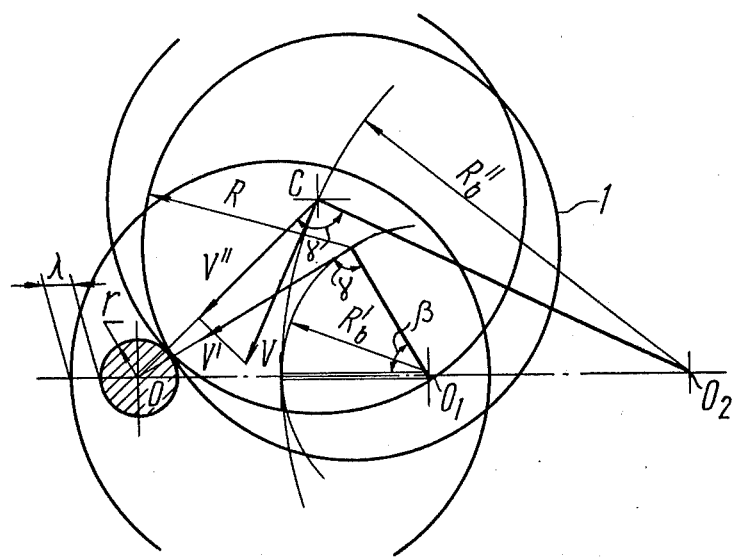
FIG. 1 is a schematic diagram illustrating the way the disk fed along a circular path is cutting a rolled product of circular cross section.
Figure 2:
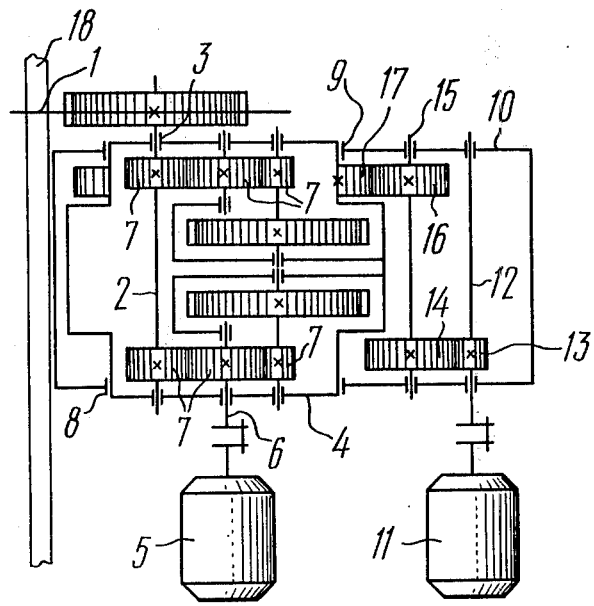
FIG. 2 is a schematic diagram of the disclosed machine for the hot shearing of rolled products.

In addition, to reducing the radius of gyration of the disk shaft, there is the possibility of improving the layout of the machine as illustrated in FIG. 2. The machine incorporates a serrated cutting disk I fitted on a shaft 2 whose bearings 3 are mounted inside a carrier 4. The disk obtains rotary motion from a motor 5 through a centrally-located sun shaft 6 and a train of gears 7. The carrier shaft 4 is in the nature of a hollow housing supported by bearings 8 and 9 of a housing 10 of the reducer driving the carrier 4. The drive of carrier consists of a motor II linked up with a shaft 12 through a coupling and fitted to the shaft 12 is a pinion 13 meshing a gear 14. Said gear is accommodated on a shaft 15 which also carries a pinion 16 meshing a gear 17 fitted immovably on the carrier.

The diameter of the bearing 9 is smaller than the diameter of the cutting disk I and the radius, $R_n$, of said bearing is bigger than the distance, $R_b$, between the parallel axes of rotation of the carrier 4 and the shaft 2 of the disk 1. The distance $R_b$ must be at least half the size of a rolled product 18 in its cross section or otherwise no cutting will take place.

The machine operates on the following lines. The motor 5 sets the disk into rotation at a requisite speed through the sun shaft 6 and the train of gears 7. The motor II imparts rotary motion to the carrier 4 in the bearings 8 and 9 through the pinion and gears 13, 14, 16 and 17 so that the centre of the disc I starts moving along the radius $R_b < R$, assuring an optimum feed onto the rolled product 18.

Since all the units of the machine are accommodated in a single casing, the layout of the machine is improved towards making it a compact one and so is the serviceability, for the running of such machine is simplified and also simplified are the lubricating systems. In addition, the floor area occupied by the machine is reduced.

EXAMPLE

For cutting rolled products with a diameter of 400 mm by a machine of the known layout use was made of a serrated disk 2 m in diameter fed along a circular path with a radius, $R_b$, of 1.7 m. The power of carrier-driving motor was 420 kW. A recourse for cutting the same rolled products to a machine of the layout disclosed has enabled a reduction in the distance, $R_b$, to 0.6 m and in the power of carrier-driving motor to 75 kW. The weight of this machine was only one-half that of its predecessor.

We claim:

1. A machine for hot shearing rolled products comprising a carrier shaft in the nature of a hollow housing adapted to be mounted for rotation about a carrier axis; a disk shaft mounted on said carrier for rotation about a disk shaft axis, at least a portion of said disk shaft extending beyond said carrier; a serrated disk having a diameter and mounted on said disk shaft portion and adapted to rotate with rotation of the same; means at least partially enclosed in said carrier shaft for imparting rotary motion to said disk shaft and serrated disk; first bearings mounted on said carrier for rotatably supporting said disk shaft; a reducer having a housing, said carrier being mounted for rotation on said reducer housing; means for imparting rotary motion to said carrier through said reducer, said disk shaft being eccentrically spaced from said carrier axis to move said serrated disk along a circular path; a second bearing means having a diameter and mounted on said housing for rotatably supporting said carrier, the distance between said carrier and disk shaft axes being smaller than at least one of said disk and second bearing means diameters, whereby relatively high forces can be applied by said serrated disk to a product to be cut with a relatively small and compact machine.

2. A machine as defined claim 1, wherein said disk shaft axis is substantially parallel to said carrier axis.

3. A machine as defined in claim 2, wherein said second bearings means has a diameter greater than the distance between said parallel axes of said carrier and said disk shaft.

4. A machine as defined in claim 1, wherein the distance between said parallel axes of said carrier and said disk shaft is equal to at least one-half of the cross-sectional dimension of the rolled product.

5. A machine as defined in claim 1, wherein said second bearings means has a diameter smaller than the diameter of said serrated disk.

6. A machine as defined in claim 1, wherein said means for imparting rotary motion to said disk shaft and to said carrier through said reducer comprise independent motors.

7. A machine as defined in claim 1, wherein said means for imparting rotary motion to said carrier through said reducer comprises a gearing arrangement of said reducer, and a gear on said carrier meshingly engaged with said reducer gearing arrangement.

8. A machine as defined in claim 1, wherein said reducer is coupled to said carrier only by means of a gearing arrangement.

9. A machine as defined in claim 1, wherein said carrier comprises a hollow housing, and wherein said disk shaft and said means for imparting rotary motion to said disk shaft are coupled by means of a gear arrangement comprising a plurality of gears mounted on respective shafts within said carrier housing, said first bearing means comprising a plurality of bearings mounted on said carrier for rotatably supporting said shafts of said plurality of gears to increase the bearing capacity which can be applied by said serrated disk.

10. A machine as defined in claim 1, wherein said carrier and said means for imparting rotary motion to said carrier through said reducer are coupled through a gearing arrangement of said reducer comprising a plurality of gears mounted on respective shafts within said reducer housing, said second bearing comprising a plurality of bearings mounted on said reducer housing for rotatably supporting said shafts of said plurality of gears to increase the bearing capacity which can be applied by said carrier and serrated disk.

* * * * *